Patented June 14, 1932

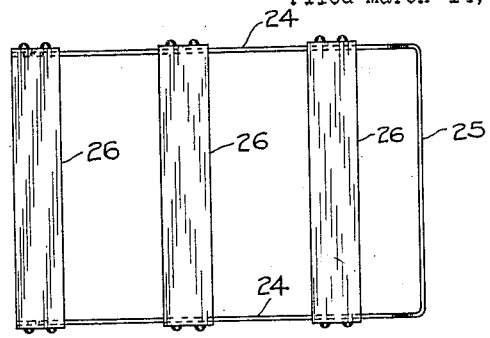
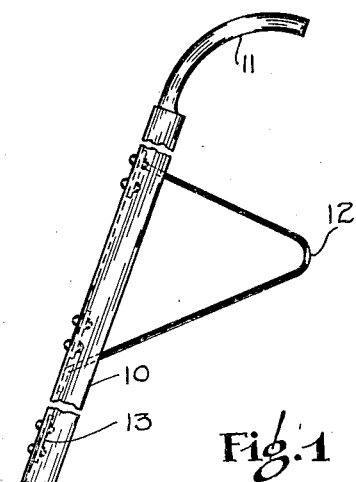
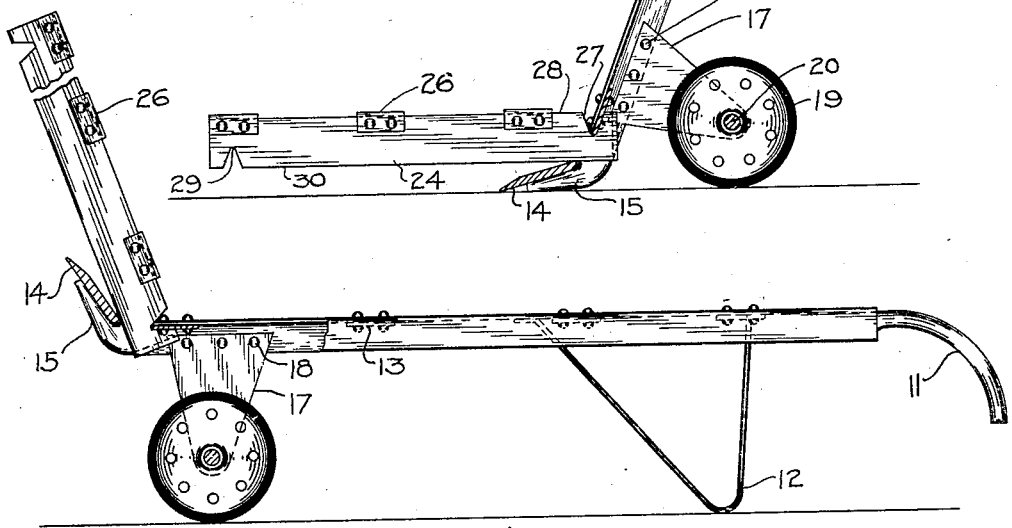
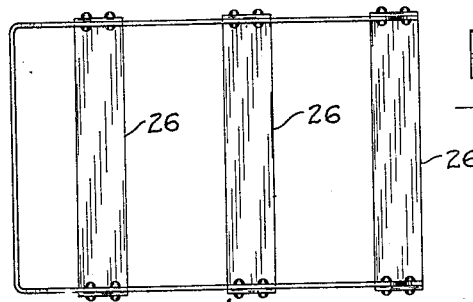
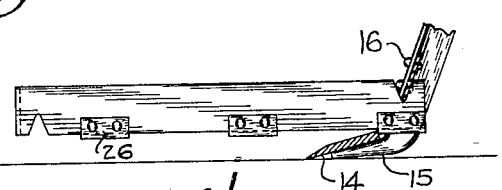
June 14, 1932. S. J. PEHRSSON 1,862,546
DETACHABLE CARRIER FOR HAND TRUCKS
Filed March 14, 1930
Fig. 1
Fig. 2
Fig. 3
Fig. 4
Fig. 5
Inventor
Sven Johan Pehrsson,
By Slough + Canfield,
His Attorneys.

1,862,546

UNITED STATES PATENT OFFICE

SVEN JOHAN PEHRSSON, OF ELYRIA, OHIO, ASSIGNOR TO THE COLSON COMPANY, OF ELYRIA, OHIO, A CORPORATION OF OHIO

DETACHABLE CARRIER FOR HAND TRUCKS

Application filed March 14, 1930. Serial No. 435,758.

My invention relates to hand-trucks, and particularly to auxiliary racks or carriers for the same.

It is one of the objects of my invention to provide an auxiliary rack which will generally increase the range of usefulness of the general type of two-wheeled trucks now in common use in warehouses, stores, factories, freight and express offices, and the like.

Another object of my invention is to provide an auxiliary rack for hand-trucks, which may be either attached to or detached from the truck by simple interlocking means so that the rack, once in locked position, will not "jog" loose or become unlocked through any ordinary manipulation of the truck.

Another object of my invention is to provide a detachable auxiliary rack, which will serve either as a container or as a platform, the reversal of the rack on the truck accomplishing either, as the operator desires, and adapted to be automatically locked onto the truck in carrying position.

Still another object of my invention is to provide an auxiliary rack for hand-trucks which will be efficient in use, durable and comparatively inexpensive to manufacture.

Other objects of my invention and the invention itself, will become apparent by reference to the following description of an embodiment of my invention, which is illustrated in the following drawing.

Referring to the drawing:

Fig. 1 is a side elevational view of a hand-truck as shown in its inoperative or loading position, with the auxiliary rack of my invention attached hereto;

Fig. 2 is a top plan view of the auxiliary rack in its platform or carrier position;

Fig. 3 is a side elevational view of the truck, as seen in its operative position, with rack attached;

Fig. 4 is a top plan view of the rack showing its reversed position when employed as a box or container;

Fig. 5 is a fragmentary view showing the rack in locked position with the truck.

Referring to the embodiment illustrated in Figs. 1 and 2, I show a substantially rectangular truck frame with side members 10, having terminal handles 11, a looped steel rest 12 attached to each of the side members 10. The side members are held in spaced parallel relation to each other by a plurality of cross bars 13. A scoop or toe plate 14 is rigidly secured to the lower end 15 of the frame therewith, by bolts 16. A pair of wheel supporting brackets 17 are secured to the side members 10 near their ends by bolts 18 and extend downwardly therefrom. One of a pair of preferably rubber tired wheels 19 is rotatably journalled within one of the brackets 17 upon an axle 20, extending through axially aligned apertures 21 of the side elements of the bracket.

The auxiliary rack 22 comprises a preferably U-shaped frame 23 having parallel side arm members 24 and a connecting yoke portion 25. The side members 24 are connected by a plurality of spaced cross bars or plates 26, and preferably oppositely notched at each end, as shown at 27 for the end 28 and at 29 for the end 30.

The cross plates 26 are preferably of sheet metal and terminate at each end in angularly deflected ends, which embrace the outer lateral surfaces of the two side arms 24, to which they are rigidly affixed, as by welding or riveting.

Either of the notched portions 27 or 29 is adapted to interlock the lower cross bar 13 of the hand-truck and to be securely held in notched engagement therewith.

The hand-truck may be used quite independently of the rack and the latter is used only when a load of comparatively bulky material or of unusual dimensions is to be handled. In operation, the operator slides the rack into the space between the side members 10 of the truck and the lower cross bar 13 thereof, causing notched engagement with such cross bar or brace. When the truck stands in either its operative or inoperative and "loading" position, the auxiliary rack rests upon the toe plate or scoop 14 and is the more securely held thereby, the weight of the load securing it against the scoop in the former instance and the natural position in the latter.

For the purpose of such illustration, the rack may be in either the position shown in Figs. 1 and 2 or in that shown in Figs. 4 and 5. In the former position, the auxiliary rack may be used as a platform or carrier, in the latter as a box, basket, container or the like, the mode of operation being the same.

When the auxiliary rack is not required, it may be quickly and conveniently removed from the truck by a simple manual movement of the operator but the rack in locked engagement will not "jog" loose or become unnotched by any ordinary manipulation of the truck.

Having thus described my invention in a specific embodiment, I am aware that numerous and extensive departures may be made from the embodiment herein illustrated and described but without departing from the spirit of my invention.

I claim:

1. In an auxiliary rack for hand trucks of the push type, the combination of a pair of laterally disposed longitudinally extending side bars, cross bars interconnecting the side bars, said side bars each being notched near an end, said notches being oppositely disposed to each other and adapted to receive a cross bar of the truck projected therein and making interlocking engagement therewith.

2. In an auxiliary rack for hand trucks of the push type, the combination of a pair of laterally disposed longitudinally extending side bars, cross bars interconnecting the side bars, said side bars each being notched near an end, said notches being oppositely disposed to each other and adapted to receive a cross bar of the truck projected therein and making interlocking engagement therewith, said rack cross bars disposed in parallelism on the same side of the side bars.

3. In an auxiliary rack for hand trucks of the push type, the combination of a pair of laterally disposed longitudinally extending side bars, cross bars interconnecting the side bars, said side bars each being notched near an end, said notches being oppositely disposed to each other and adapted to receive a cross bar of the truck projected therein and making interlocking engagement therewith, said rack cross bars disposed in parallelism on the same side of the side bars, said cross bars having their flanges adapted to fit over and embrace the side bars.

4. In an invertible auxiliary rack for hand trucks of a push type, the combination of a pair of laterally disposed longitudinally extending side bars, cross bars interconnecting side bars, said side bars each being notched on inverted opposite ends, said notches adapted to receive a cross bar of the truck projected therein and making interlocking engagement therewith.

5. In an auxiliary rack for hand trucks of the pushed type having two side portions substantially parallel to each other and disposed at approximately right angles to a pair of oppositely disposed ends, a pair of oppositely extending notches on each of the two opposite sides and ends of the side portions, each of said pair of notches adapted interchangeably to receive a cross-bar of the truck and make interlocking engagement therewith.

In testimony whereof I hereunto affix my signature this 6th day of March, 1930.

SVEN JOHAN PEHRSSON.